United States Patent
Wu et al.

(10) Patent No.: US 11,531,172 B2
(45) Date of Patent: Dec. 20, 2022

(54) WAFER-LEVEL TESTING OF LASERS ATTACHED TO PHOTONICS CHIPS

(71) Applicant: GLOBALFOUNDRIES U.S. Inc., Santa Clara, CA (US)

(72) Inventors: Zhuojie Wu, Port Chester, NY (US); Bo Peng, Wappingers Falls, NY (US)

(73) Assignee: GlobalFoundries U.S. Inc., Santa Clara, CA (US)

( * ) Notice: Subject to any disclaimer, the term of this patent is extended or adjusted under 35 U.S.C. 154(b) by 254 days.

(21) Appl. No.: 15/930,876

(22) Filed: May 13, 2020

(65) Prior Publication Data

US 2021/0356684 A1 Nov. 18, 2021

(51) Int. Cl.
| | | |
|---|---|---|
| G01J 3/18 | (2006.01) | |
| G02B 6/42 | (2006.01) | |
| G02B 6/43 | (2006.01) | |
| G02B 6/293 | (2006.01) | |

(52) U.S. Cl.
CPC .............. *G02B 6/4215* (2013.01); *G01J 3/18* (2013.01); *G02B 6/29316* (2013.01); *G02B 6/43* (2013.01)

(58) Field of Classification Search
CPC ...... G02B 6/29316; G02B 6/4215; G01J 3/18
See application file for complete search history.

(56) References Cited

U.S. PATENT DOCUMENTS

| | | |
|---|---|---|
| 6,448,805 B1 | 9/2002 | Heald et al. |
| 8,644,654 B2 | 2/2014 | Wu et al. |
| 9,086,387 B2 | 7/2015 | Assefa et al. |
| 10,042,131 B1 | 8/2018 | Lesea |
| 2018/0180829 A1 | 6/2018 | Gudeman |
| 2018/0259337 A1* | 9/2018 | Wang .................... G01C 19/721 |
| 2019/0120624 A1* | 4/2019 | Piazza .................... G10K 11/36 |
| 2020/0124792 A1* | 4/2020 | Cho ........................ G01M 11/33 |

FOREIGN PATENT DOCUMENTS

| | | |
|---|---|---|
| CN | 110678791 A | 1/2020 |
| TW | 201143314 A | 12/2011 |
| TW | I675229 | 10/2019 |

OTHER PUBLICATIONS

Justin C. Norman, "Perspective: The future of quantum dot photonic integrated circuits", 2018 (Year: 2018).*
Afrotechmod,"constant current source and laser/LED driver tutorial", https://www.youtube.com/watch?v=iuMngik0GR8 (Year: 2015).*
Technology and Science Education, "Basics of Photodetectors", https://www.youtube.com/watch?v=vjw3gwvKAzo, (Year: 2016).*
Taiwan Intellectual Property Office, Examination Report in Taiwanese Patent Application No. 110113233.

(Continued)

*Primary Examiner* — Maurice C Smith
(74) *Attorney, Agent, or Firm* — Thompson Hine LLP; Anthony Canale

(57) ABSTRACT

Structures for a photonics chip, testing methods for a photonics chip, and methods of forming a structure for a photonics chip. A photonics chip includes a first waveguide, a second waveguide, an optical tap coupling the first waveguide to the second waveguide, and a photodetector coupled to the second waveguide. A laser is attached to the photonics chip. The laser is configured to generate laser light directed by the first waveguide to the optical tap.

18 Claims, 3 Drawing Sheets

(56) References Cited

OTHER PUBLICATIONS

K. Giewont et al., "300-mm Monolithic Silicon Photonics Foundry Technology," in IEEE Journal of Selected Topics in Quantum Electronics, vol. 25, No. 5, pp. 1-11, Sep.-Oct. 2019, doi: 10.1109/JSTQE.2019.2908790.
Taiwan Intellectual Property Office, Notice of Allowance in Taiwanese Patent Application No. 110113233.

* cited by examiner

WAFER-LEVEL TESTING OF LASERS ATTACHED TO PHOTONICS CHIPS

BACKGROUND

The present invention relates to photonics chips and, more specifically, to structures for a photonics chip, testing methods for a photonics chip, and methods of forming a structure for a photonics chip.

Photonics chips are used in many applications and systems, such as data communication systems and data computation systems. A photonics chip integrates optical components, such as waveguides, optical switches, edge couplers, and polarizers, and electronic components, such as field-effect transistors, into a unified platform. Among other factors, layout area, cost, and operational overhead may be reduced by the integration of both types of components.

Current testing of lasers at a wafer level suffers from several shortcomings. For example, variations in power measurements may limit the accuracy of wafer-level laser testing. Current testing techniques may also cause reverse reflection that can damage the laser under testing.

Improved structures for a photonics chip, testing methods for a photonics chip, and methods of forming a structure for a photonics chip are needed.

SUMMARY

In an embodiment of the invention, a structure includes a photonics chip having a first waveguide, a second waveguide, an optical tap coupling the first waveguide to the second waveguide, and a photodetector coupled to the second waveguide. A laser is attached to the photonics chip. The laser is configured to generate laser light directed by the first waveguide to the optical tap.

In an embodiment of the invention, a method of testing a laser attached to a first photonics chip at a wafer level is provided. The method includes ramping a first electrical current supplied to the laser such that an optical power of laser light that is output by the laser increases, directing a portion of the laser light to a photodetector on the photonics chip; and measuring a second electrical current generated by the photodetector in response to the portion of the laser light as a function of the electrical current.

In an embodiment of the invention, a method includes forming a photonics chip having a first waveguide, a second waveguide, an optical tap coupling the first waveguide to the second waveguide, and a first photodiode coupled to the second waveguide. The method further includes attaching a laser attached to the photonics chip. The laser is configured to generate laser light directed by the first waveguide to the optical tap.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

DETAILED DESCRIPTION

Figure 1:
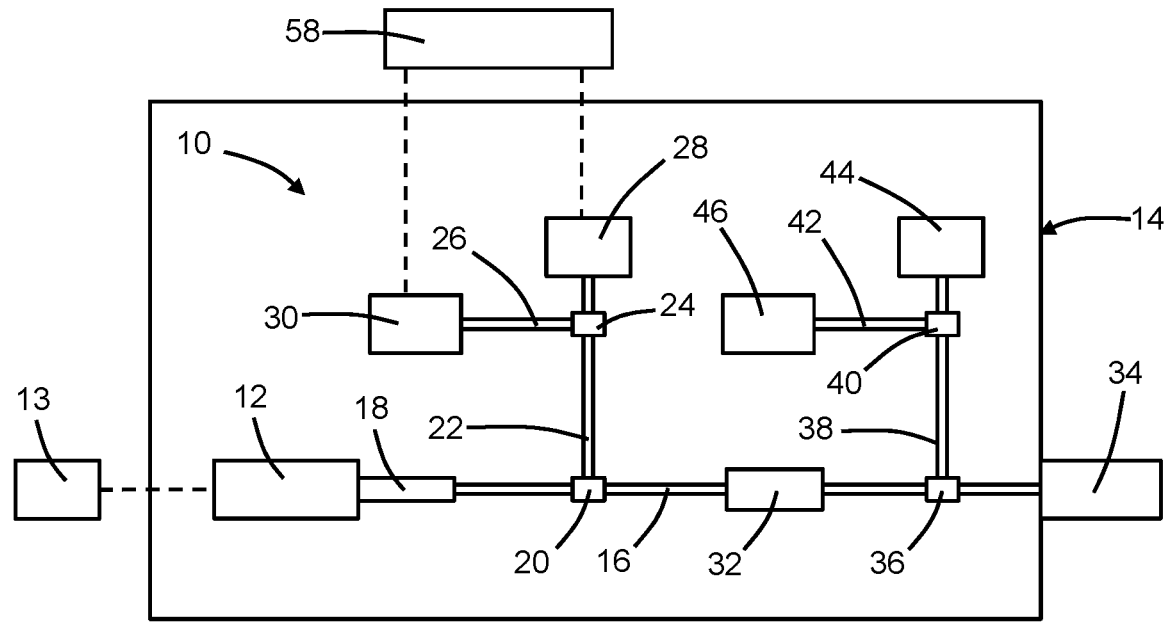
FIG. 1 is a diagrammatic view of a photonics chip in accordance with embodiments of the invention.

With reference to FIG. 1 and in accordance with embodiments of the invention, a structure 10 includes a laser 12 that is attached to a photonics integrated circuit or chip 14, as well as a waveguide 16 and an edge coupler 18 on the photonics chip 14. The laser 12 may be separately manufactured and may be attached to surfaces surrounding a cavity formed in a substrate 62 (FIG. 5) of the photonics chip 14. In an embodiment, the laser 12 may be directly attached to the cavity surfaces by flip-chip bonding. The laser 12 may be, for example, a III-V compound semiconductor laser that is configured to generate and output continuous laser light in an infrared wavelength range. For example, the laser 12 may generate and output laser light at a nominal wavelength of 1310 nm or at a nominal wavelength of 1550 nm. The edge coupler 18, which may have the form of an inverse taper or be formed from a metamaterial, is configured to receive laser light from the laser 12 as input to the waveguide 16.

The photonics chip 14 includes an optical tap 20 coupled to the waveguide 16. The edge coupler 18 is positioned between the laser 12 and the optical tap 20. The optical tap 20 may be a directional coupler that branches or directs a portion of the laser light being guided by the waveguide 16 to a different waveguide 22. In an embodiment, the portion of the laser light directed from the waveguide 16 to the waveguide 22 by the optical tap 20 may be about five (5) percent with about ninety-five (95) percent of the laser light continuing to be guided downstream by the waveguide 16.

The photonics chip 14 includes an optical tap 24 coupled to the waveguide 22. The optical tap 24 may be a directional coupler that branches or directs a portion of the laser light being guided by the waveguide 22 to a different waveguide 26. In an embodiment, the portion of the laser light directed from the waveguide 22 to the waveguide 26 by the optical tap 24 may be about fifty (50) percent with about fifty (50) percent of the laser light continuing to be guided by the waveguide 22.

The photonics chip 14 includes a photodetector 28 coupled to the waveguide 22. The optical tap 24 is positioned between the optical tap 20 and the photodetector 28. In an embodiment, the photodetector 28 may be a germanium photodiode that efficiently absorbs photons of laser light in an infrared wavelength range. The photodetector 28 may be epitaxially grown inside a shallow cavity partially recessed in the waveguide 22 by a selective growth process. The photodetector 28 is configured to detect the optical power that is output by the laser 12 by converting the laser light to electrical carriers that, as a function of time, provides an electrical current in the form of a photocurrent. For example, the photodetector 28 may be, for example, a lateral PIN photodiode that includes p-doped and n-doped regions that are contacted to provide electrical connections for collecting the photocurrent. The photocurrent output by the photodetector 28 that varies as a function of the optical power. The photodetector 28 may be designed to provide a photocurrent that is linear over a range of optical powers.

The photonics chip 14 includes a grating coupler 30 coupled to the waveguide 26. The optical tap 24 is positioned between the optical tap 20 and the grating coupler 30. The grating coupler 30 is configured to permit testing of the optical spectrum of the laser light emitted by the laser 12. The grating coupler 30 may include grating periods that are arranged with a given pitch and duty cycle, and that satisfy Bragg conditions to direct the laser light off the photonics chip 14 for optical spectrum testing. The back reflection from the grating coupler 30 is limited by the optical taps 20, 24, which protects the laser 12 against damage.

The photonics chip 14 includes an optical switch or modulator 32 that is configured to modulate the laser light from the laser 12 into binary laser light that encodes digital information. For example, the modulator 32 may be a Mach-Zehnder interferometer (MZI) modulator. The optical tap 24 is coupled to the waveguide 16 at a location between the edge coupler 18 and the modulator 32. The waveguide 16 may direct the modulated laser light to a single-mode fiber 34 coupled to the photonics chip 14. The single-mode fiber 34 may have a tip with a geometry that is selected to improve the overall coupling efficiency with the waveguide 16.

The photonics chip 14 may further include an optical tap 36 coupled to the waveguide 16 at a positioned between the modulator 32 and the single-mode fiber 34. The optical tap 36 may be a directional coupler that diverts a percentage (e.g., about 5%) of the modulated laser light being guided by the waveguide 16 to a different waveguide 38. The photonics chip 14 may includes an optical tap 40 coupled to the waveguide 38. The optical tap 40 may be a directional coupler that diverts a percentage (e.g., about 50%) of the modulated laser light being guided by the waveguide 38 to a different waveguide 42. The photonics chip 14 may include a photodetector 44 coupled to the waveguide 38. The optical tap 40 is positioned between the optical tap 36 and the photodetector 44. The photodetector 44 may be similar or identical to the photodetector 28. The photonics chip 14 may include a grating coupler 46 coupled to the waveguide 42. The optical tap 40 is positioned between the optical tap 36 and the grating coupler 46. The photodetector 44 and grating coupler 46 may be used for system-level testing.

The waveguides 16, 22, 26, 38, 42, optical taps 20, 24, 36, 40, edge coupler 18, and modulator 32 of the photonics chip 14 may include waveguide cores that are comprised of a single-crystal semiconductor material, such as single-crystal silicon, and located over a dielectric layer. The single-crystal semiconductor material may originate from a device layer of a silicon-on-insulator (SOI) substrate 62 (FIG. 5), which includes a buried oxide layer representing the underlying dielectric layer. The waveguide cores may be patterned from a layer of the single-crystal semiconductor material by lithography and etching processes during front-end-of-line processing of the photonics chip 14, and the waveguide cores may be surrounded by a dielectric material of lower refractive index.

A power supply 13, which may be located off the photonics chip 14, may be coupled to the laser 12. A wafer-level optical test system 58, which is located off the photonics chip 14, is configured to test the performance of the laser 12 based on outputs received from the photodetector 28 and grating coupler 30. Electrical connections with power supply 13 and the wafer-level optical test system 58 may be established by electrical pads of the photonics chip 14. An optical fiber may connect the grating coupler 30 with the wafer-level optical test system 58.

In use for wafer-level testing of the laser 12, the power supply 13 to the laser 12 may supply a ramped electrical current under constant voltage to vary the optical power of the laser light output by the laser 12. A portion of the laser light is directed by the optical taps 20, 24 to the photodetector 28, which generates a photocurrent that increases, preferably linearly, with increasing optical power. The wafer-level optical test system 58 measures the photocurrent from the photodetector 28 as an electrical current and calculates an optical power from the measured photocurrent. The optical power can be plotted as a function of the electrical current supplied to the laser 12 in order to, for example, establish operating conditions for the laser 12. Optionally, the optical spectrum may be measured by the wafer-level optical test system 58 using the grating coupler 30 as the optical power emitted by the laser 12 is ramped. The laser 12 may then be operated at an output power that is approximately constant (e.g., non-ramped) and an optical spectral test may be performed by the wafer-level optical test system 58 based on the laser light output from the grating coupler 30. Optionally, the optical power may be monitored by the wafer-level optical test system 58 by measuring the photocurrent from the photodetector 28 during the optical spectral test. These tests may be repeated under different temperature conditions.

The structure 10 may enable fast and reliable wafer-level testing for characterization of the attachment of the laser 12 to the photonics chip 14 due to the on-chip photodetector 28 and the on-chip grating coupler 30. The structure 10 may enable reliability qualification at the wafer level and without artifacts from fiber attachment given that the laser 12 is coupled to the edge coupler 18 without an intervening fiber. The structure 10 may promote the selection of Known Good Die (KGD) from photonics chips 14 manufactured on the same substrate 62 (FIG. 5) for subsequent product packaging.

Figure 2:
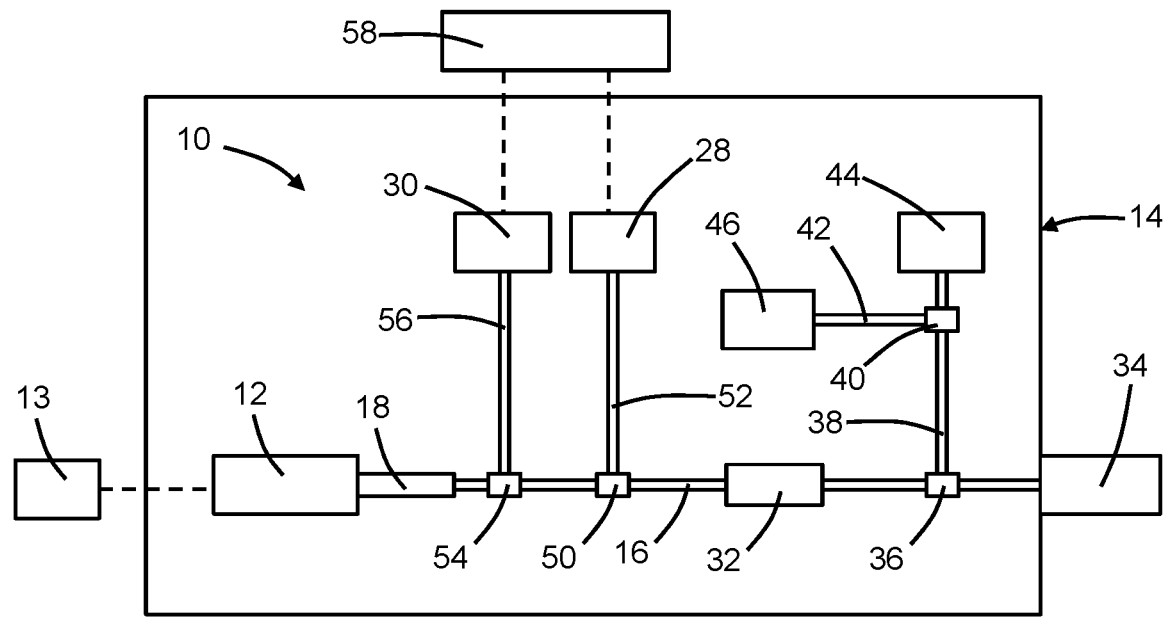
FIG. 2 is a diagrammatic view of a photonics chip in accordance with embodiments of the invention.

With reference to FIG. 2 and in accordance with alternative embodiments of the invention, the photodetector 28 and grating coupler 30 may have separate connections to the waveguide 16. The photodetector 28 may be coupled by an optical tap 50 and a waveguide 52 to the waveguide 16 at a location between the edge coupler 18 and the modulator 32. The grating coupler 30 may be coupled by an optical tap 54 and a waveguide 56 to the waveguide 16 at a location between the edge coupler 18 and the modulator 32. The optical taps 50, 54 may be similar or identical construction and function to the optical taps 20, 24.

Figure 3:
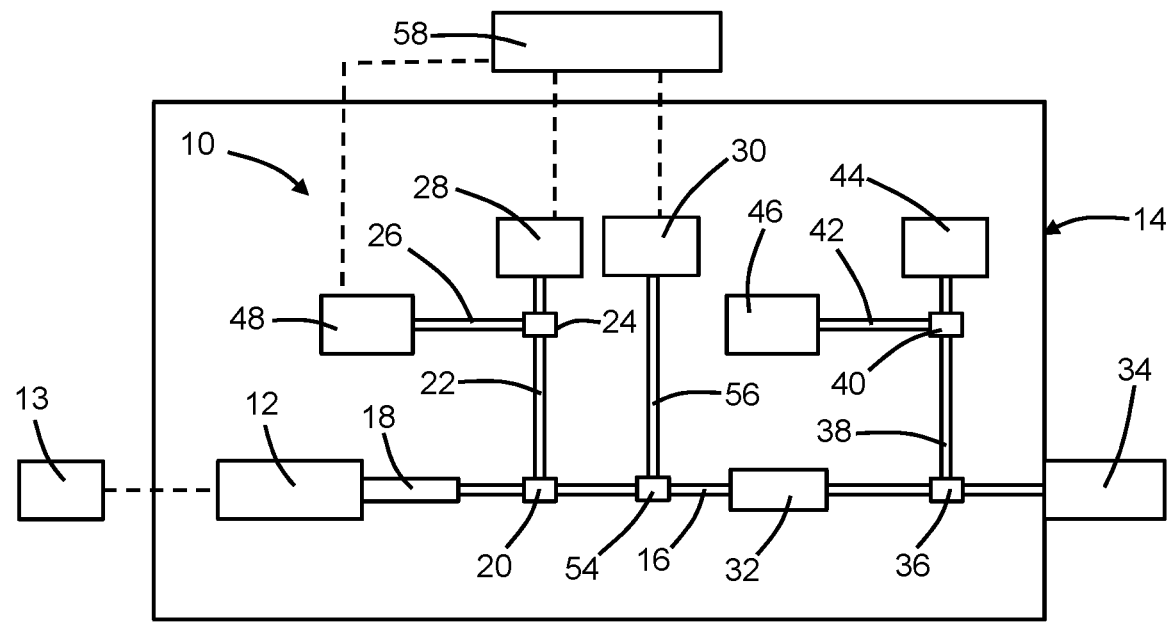
FIG. 3 is a diagrammatic view of a photonics chip in accordance with embodiments of the invention.

With reference to FIG. 3 and in accordance with alternative embodiments of the invention, another photodetector 48 may be coupled to the waveguide 26 instead of the grating coupler 30. The grating coupler 30 may be separately coupled to the waveguide 16 by the optical tap 54 and waveguide 56. The photodetector 48 may be similar or identical in construction and function to the photodetector 28. The photodetector 48 may provide redundancy when measuring the optical power of the laser 12.

Figure 4:
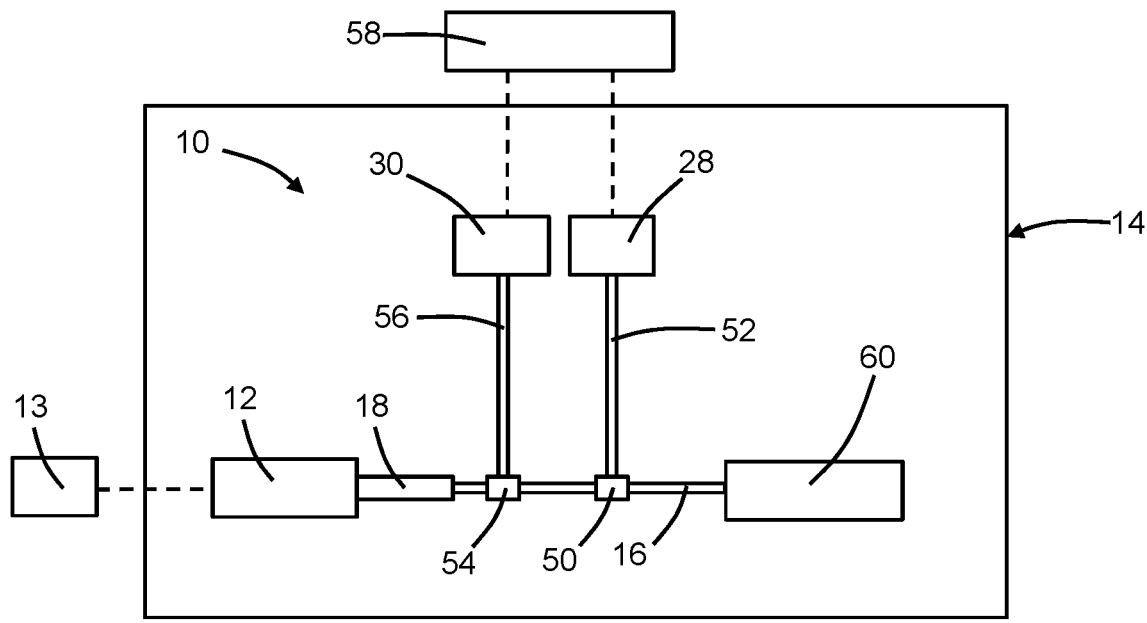
FIG. 4 is a diagrammatic view of a photonics chip in accordance with embodiments of the invention.

With reference to FIG. 4 and in accordance with alternative embodiments of the invention, the waveguide 16 may couple the laser 12 to an absorber 60 if the photonics chip 14 is being used as a pure test vehicle for the laser 12. The absorber 60 may be, for example, a germanium absorber or a set of silicon scattering spirals. In alternative embodiments, the absorber 60 may also be used in connection with the structures 10 of either FIG. 1 or FIG. 3. The absorber 60 functions to absorb and dissipate the laser light, which is not directed off of the photonics chip 14.

Figure 5:
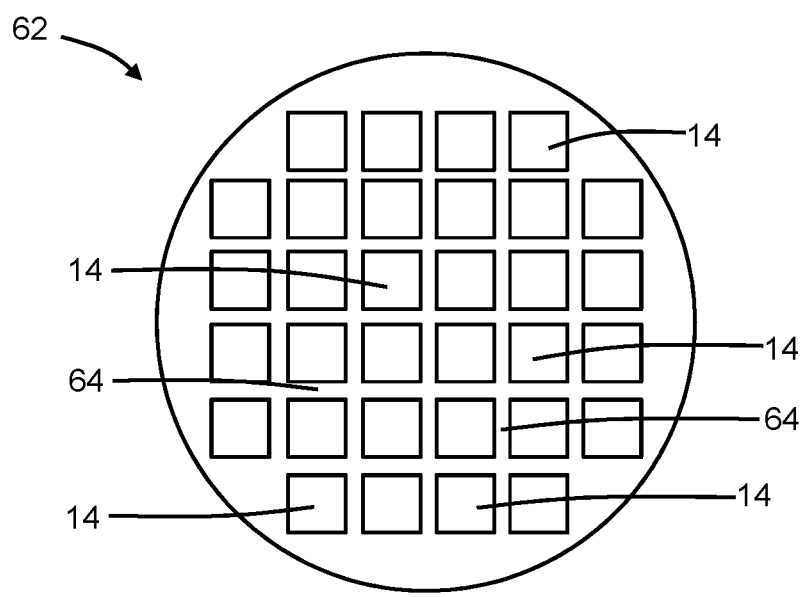
FIG. 5 is a schematic view of semiconductor substrate that includes multiple photonics chip in accordance with embodiments of the invention.

With reference to FIG. 5 and in accordance with embodiments of the invention, a silicon-on-insulator (SOI) wafer or substrate 62 includes a usable chip area on its frontside that has been processed to fabricate a group of photonics chips 14 that are identical or substantially identical. The number of photonics chips 14 yielded from the SOI substrate 62 is a function of the chip size, as well as the substrate size. The photonics chips 14 may be arranged with a spaced-apart arrangement in an array or matrix of rows and columns.

Scribe lines 64 define scribe lanes that are arranged between adjacent rows of photonics chips 14 in the array and between adjacent columns of photonics chips 14 in the array. The scribe lines 64 represent a grid of cutting lines along which the photonics chips 14 may be diced using a dicing saw or a laser, without inflicting damage to the photonics chips 14. After wafer level testing of the laser 12 on one or more of the photonics chips 14 on the substrate 62, the substrate 62 may be diced to physically singulate the photonics chips 14. In an embodiment, the lasers 12 on all of the photonics chips 14 on the substrate 62 may be wafer level tested. Following physical singulation, each photonics chip 14 may then be separately packaged.

The methods as described above are used in the fabrication of photonic integrated circuits (i.e., photonics chips). The resulting photonics chips can be distributed by the fabricator in raw wafer form (e.g., as a single wafer that has multiple unpackaged chips), as a bare die, or in a packaged form. In the latter case, the photonics chip is mounted in a single chip package (e.g., a plastic carrier, with leads that are affixed to a motherboard or other higher level carrier) or in a multichip package (e.g., a ceramic carrier that has either or both surface interconnections or buried interconnections). In any case, the photonics chip may be integrated with other chips, discrete circuit elements, and/or other signal processing devices as part of either an intermediate product or an end product.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate +/−10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction perpendicular to the horizontal, as just defined. The term "lateral" refers to a direction within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent. A feature may be "indirectly on" or in "indirect contact" with another feature if at least one intervening feature is present.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure comprising:
a first photonics chip including a first waveguide, a second waveguide, a third waveguide, a first optical tap coupling the second waveguide to the first waveguide, a second optical tap coupling the third waveguide to the first waveguide, a first photodetector coupled to the second waveguide, and a first grating coupler coupled to the third waveguide; and
a first laser attached to the first photonics chip, the first laser configured to generate laser light directed by the first waveguide to the first optical tap and the second optical tap.

2. The structure of claim 1 wherein the first photonics chip includes a fourth waveguide, a second photodetector coupled to the fourth waveguide, and a third optical tap coupling the fourth waveguide to the second waveguide.

3. The structure of claim 1 wherein the first photonics chip includes an absorber, and the first waveguide is configured to couple the first laser to the absorber.

4. The structure of claim 1 further comprising:
a substrate including the first photonics chip, a second photonics chip, and a scribe line separating from the first photonics chip from the second photonics chip.

5. A structure comprising:
a first photonics chip including a first waveguide, a second waveguide, a first optical tap coupling the second waveguide to the first waveguide, and a first photodetector coupled to the second waveguide; and
a first laser attached to the first photonics chip, the first laser configured to generate laser light directed by the first waveguide to the first optical tap,
wherein the first photonics chip includes an edge coupler coupling the first laser to the first waveguide and a modulator coupled to the first waveguide, and the first optical tap is coupled to the first waveguide at a first position between the edge coupler and the modulator.

6. The structure of claim 5 wherein the first photonics chip includes a third waveguide, a second photodetector coupled to the third waveguide, a second optical tap coupling the third waveguide to the first waveguide at a second position, and the modulator is positioned between the first position and the second position.

7. The structure of claim 5 wherein the first photonics chip includes a third waveguide, a grating coupler coupled to the third waveguide, and a second optical tap coupling the third waveguide to the second waveguide.

8. The structure of claim 7 wherein the second optical tap is configured to direct about fifty percent of the laser light from the second waveguide to the third waveguide.

9. The structure of claim 5 wherein the first photonics chip includes a third waveguide, a grating coupler coupled to the third waveguide, and a second optical tap coupling the third waveguide to the first waveguide at a second position between the edge coupler and the modulator.

10. The structure of claim 9 wherein the second optical tap is configured to direct about five percent of the laser light from the first waveguide to the third waveguide.

11. The structure of claim 5 wherein the first photonics chip includes a third waveguide, a second photodetector coupled to the third waveguide, and a second optical tap coupling the third waveguide to the second waveguide.

12. The structure of claim 11 wherein the second optical tap is configured to direct about fifty percent of the laser light from the second waveguide to the third waveguide.

13. The structure of claim 5 further comprising:
a substrate including the first photonics chip, a second photonics chip, and a scribe line separating from the first photonics chip from the second photonics chip.

14. The structure of claim 5 wherein the first optical tap is configured to direct about five percent of the laser light from the first waveguide to the second waveguide.

15. A method of testing a laser attached to a first photonics chip at a wafer level, the method comprising:
ramping a first electrical current supplied to the laser such that an optical power of laser light that is output by the laser increases;
directing a first portion of the laser light to a photodetector on the first photonics chip, wherein the first photonics chip and a second photonics chip are located on a substrate;
measuring a second electrical current generated by the photodetector in response to the first portion of the laser light as a function of the first electrical current; and
singulating the first photonics chip and the second photonics chip from the substrate.

16. The method of claim 15 further comprising:
directing a second portion of the laser light to a grating coupler on the first photonics chip; and
measuring an optical spectrum generated by the grating coupler in response to the second portion of the laser light.

17. The method of claim 15 further comprising:
supplying a third electrical current to the laser such that an optical power output by the laser is approximately constant;
directing a second portion of the laser light to a grating coupler on the first photonics chip; and
measuring an optical spectrum generated by the grating coupler in response to the second portion of the laser light.

18. The method of claim 17 further comprising:
measuring a fourth electrical current generated by the photodetector in response to the first portion of the laser light while the third electrical current is supplied to the laser.

* * * * *